Figure 1:
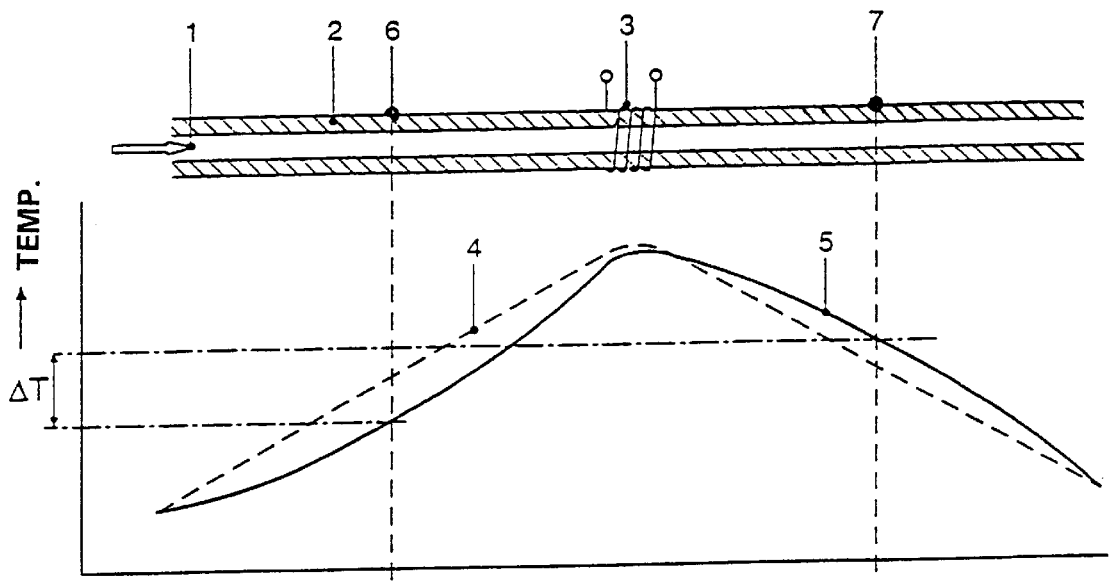

United States Patent [19]
Jouwsma et al.

[11] Patent Number: 5,970,790
[45] Date of Patent: *Oct. 26, 1999

[54] METHOD AND DEVICE FOR MEASURING FLOWS OF FLUIDS, BASED ON TEMPERATURE-DIFFERENCES BETWEEN TWO HEAT-CONDUCTING BODIES, ONE OF WHICH CONTAINS THE FLUID-FLOW

[75] Inventors: Wijbren Jouwsma, Lochem; Frederik Van Der Graaf, Zuidland, both of Netherlands

[73] Assignee: Berkin B.V., AK Ruurlo, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,110

[22] Filed: Nov. 14, 1996

[30] Foreign Application Priority Data

Nov. 17, 1995 [NL] Netherlands ............................ 1001674

[51] Int. Cl.$^6$ ...................................................... G01F 1/68
[52] U.S. Cl. ...................................................... 73/204.12
[58] Field of Search ........................... 73/204.11, 204.12, 73/204.13, 204.16, 204.27

[56] References Cited

U.S. PATENT DOCUMENTS

| 3,181,357 | 5/1965 | Benson . | |
|---|---|---|---|
| 3,818,758 | 6/1974 | Easter . | |
| 3,827,299 | 8/1974 | Welland . | |
| 3,942,378 | 3/1976 | Olmstead . | |
| 4,107,991 | 8/1978 | Benson . | |
| 4,972,707 | 11/1990 | Nijdam | 73/204.12 |
| 5,036,701 | 8/1991 | Van Der Graaf | 73/204.12 |
| 5,142,907 | 9/1992 | Hinkle | 73/204.12 |
| 5,237,866 | 8/1993 | Nijdam | 73/204.11 |

Primary Examiner—George Dombroske
Assistant Examiner—Harshad Patel
Attorney, Agent, or Firm—Ostrolenk, Faber, Gerb & Soffen, L.L.P.

[57] ABSTRACT

Method and device for measuring flows of fluids, such as liquids and gases, flowing through a tube (16). The tube is heat-conducting and is heated at a certain location (18), with the heat on the one hand moving by way of the tube wall (17) in a direction contrary to the fluid flow (15) and on the other hand flowing off into a heat-conducting body (20) which preferably extends substantially parallel to the tube. The temperature difference between the tube wall (17) and the conducting body (20) is measured, e.g., by a thermopile (19) and is a measure of the flow gone past. The device preferably includes a thermopile (19) for carrying out the measurement.

6 Claims, 2 Drawing Sheets

METHOD AND DEVICE FOR MEASURING FLOWS OF FLUIDS, BASED ON TEMPERATURE-DIFFERENCES BETWEEN TWO HEAT-CONDUCTING BODIES, ONE OF WHICH CONTAINS THE FLUID-FLOW

The invention relates to a method for measuring flows of fluids, such as liquids and gases, flowing through a tube, with heat being supplied by a heat source to two heat-conducting parts extending from the heat source, of which at least the one is a wall of the tube situated upstream or downstream with respect to the heat source, of which the temperature is compared to the temperature of the other heat-conducting part and the measured temperature difference is a measure of the flow.

Such methods are generally known. A fluid flows through a heat-conducting tube having a heating element somewhere around it. The temperature difference is then measured between two points on the tube wall, on either side, i.e., upstream and downstream from the heating element and equidistant therefrom. When the fluid does not flow, the curve showing the relationship between the temperature and the location on the tube will indicate a substantially linear relationship and be symmetrical with respect to the heating element, and therefore no temperature difference will be measured. It is assumed that, equidistantly from the heating element, in front and at the rear (upstream and downstream), the temperatures are equal. When the fluid does flow, the said curve upstream with respect to the heating element, seen in the direction of the flow, will sag and downstream it will be upwards convex. The temperature difference measured is a measure of the flow to be measured (=volume or weight flowing past per unit of time).

To increase the sensitivity of such measurements and to reduce the space occupation, a choice is sometimes made for a measuring method by means of a tube bent in a "U", through which the fluid flows, having the heating element as a spiral around the bottom part of the "U". It is then possible to measure with the help of a series of temperature sensors—e.g., with a thermopile.

A major drawback of using such a measuring device is in particular that it is hard to clean. The method according to the invention makes it possible, while retaining the advantages offered by the latter construction—with the tube bent in a "U"—, still to be capable of measuring with one straight tube and therefore with the help of a more easily cleanable device.

It has also sometimes been proposed—see, e.g., U.S. Pat. No. 3,181,357, FIG. 12 with associated description, column 5, lines 34–59-to use a method in which a fluid flows through a conductor bent in a "U" having, between the legs of the "U", a conduit through which no flow takes place. A temperature difference between a point on the fluid-conducting conductor and a point on the conduit is measured and is a measure of the amount of medium flowed past per unit of time. However: the reference conductor-the conduit 88-will then first have to be adjusted in such a manner that, at least at the locations where measurements are carried out, the temperature, or (part of) the temperature curve, coincides with that of the fluid conductors. Such adjustment is possible through the choice of materials, the choice of dimensions etc.

A drawback of such a method, however, is that the reference conductor—the conduit—must be adjusted.

The method according to the invention does not have said drawbacks. To that end, it is characterised in that of the two heat-conducting parts, which preferably run substantially parallel at a distance from one another and of which only the first part is a tube through which fluids may flow during use, which parts are thermally connected to one another with their corresponding ends, the end where the fluid leaves the tube is heated to a certain temperature and then during use the temperature curve is measured along the entire length between the ends of both the tube and the other part, with the surface between the curves, which show the two temperature curves as a function of the length, being a measure of the flow to be determined.

Compared to the measurement with the help of the tube bent in a "U" you might say that the second tube part of the "U" has now been replaced by a fixed leg. When a fluid flows through the tube in the direction of the heat source, the temperature measured at the tube wall will invariably be lower than when the fluid does not flow. Said temperature curve-mostly linear-does occur in the leg; the temperature difference between those two is now measured, e.g., in the known manner with the help of a thermopile present between the tube and the reference leg. Other methods are also possible, however. It should be noted that, when measurements are made according to the method according to the invention, the sensitivity is half compared to the one in which the tube is bent in a "U", which is apparent from the curves showing the temperature differences as a function of the distance to the heat source. It should further be noted that of course it is not necessary that the wall part in question of the tube and the leg run in parallel.

When relatively large flows are measured such as, e.g., a water flow of 200 g/h., it may be an advantage to have heat conduction take place between the outer wall and the reference leg, e.g., by making use of heat-conducting materials and/or constructions which are mounted between the two.

The invention also comprises a device for carrying out the method according to the invention. To that end, the device is characterised in that it consists of a tube piece through which the fluid to be measured flows during use, and of which the wall is heat-conducting and which at its one end co-operates with a heat source and at its other end is connected to a heat-conducting body while, also with its one end co-operating with the heat source and with its other end connected to the heat-conducting body, there extends a second heat-conducting part, of which the temperature is not affected by the fluid flow, e.g., substantially parallel to, and at a distance from, the tube piece and between the two heat-conducting parts there is located a measuring device for measuring the temperature difference between the two along their entire length or part thereof.

The heat is fed to the fluid by the tube wall. At their ends away from the heat source, the tube wall and the reference leg have the same temperature, which is achieved, e.g., by having both ends flow out into one and the same heat-conducting body. They may also be simply connected to one another. As mentioned above, the measuring device for the temperature, present between tube wall and leg, preferably is a thermopile. As heat source, there is preferably used a heating spiral. It will be understood that in this framework, instead of a heat source, a cold source may also be used.

To promote the heat transfer from tube wall to fluidum, the application of an "insert" is possible. Such an insert then consists of, e.g., a cylindrical body having a length which e.g. is equal to that of the tube and having a diameter which is less than the inner diameter of the tube. The cylinder is placed concentrically in the tube and the fluid then flows as a film along the inner wall of the tube.

It should be noted that the principle of the method and the device according to the invention may also be applied to a fluid flow through two (or more) preferably parallel tubes, with the reference leg then being located between said two tubes and the temperature differences invariably being measured between the tube parts and the central leg.

Figure 2:
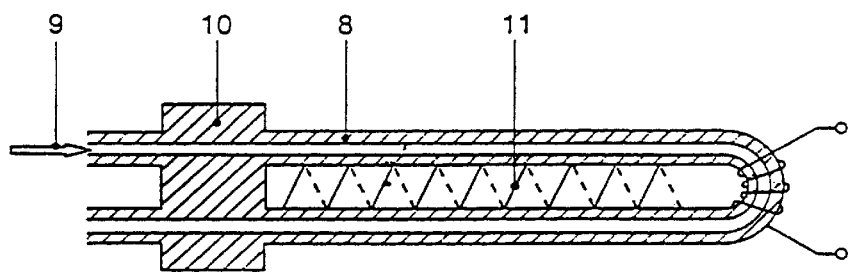
Figure 2:
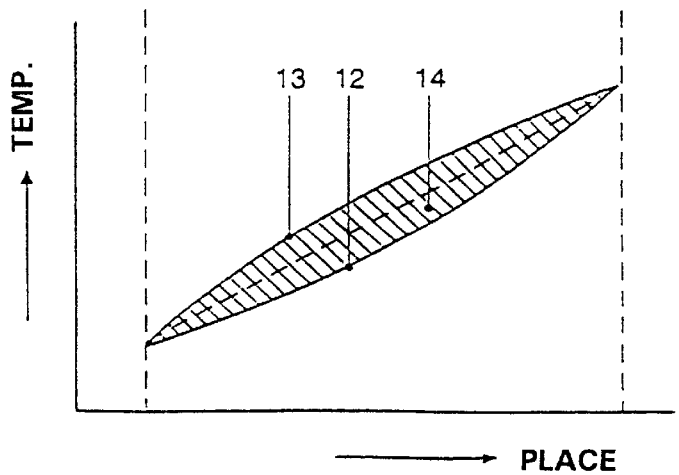
Figure 3:
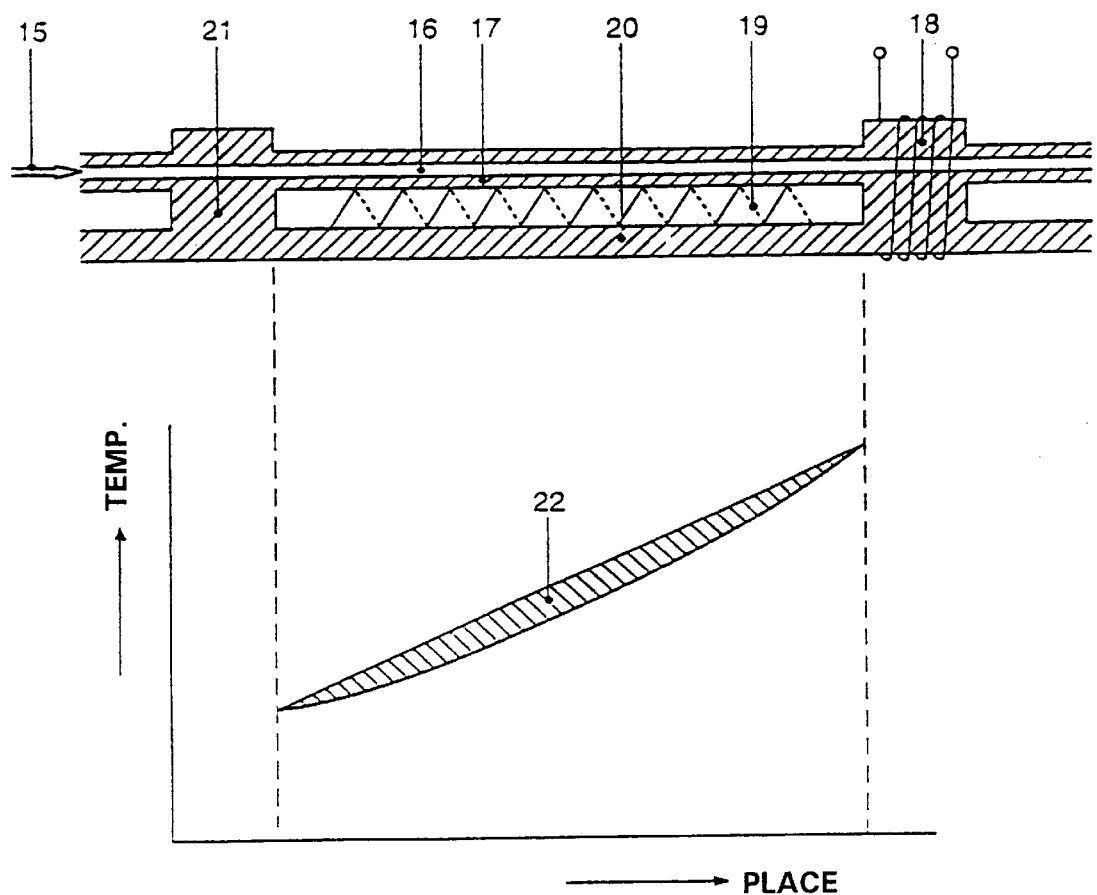

The invention will be explained in further detail by reference to the drawing, in which FIG. 1 and FIG. 2 schematically show known methods and devices for measuring flows; and FIG. 3 shows a device according to the invention.

In FIG. 1, the fluid flow 1 flows through the tube 2 in the direction indicated. Tube 2 is heated with the help of a heating spiral 3, with the generated heat running upstream and downstream by way of the conducting tube wall of the tube 2.

When there flows no fluid through the tube 2, the temperature curve, measured at the tube wall, is as shown by 4: a substantially linear curve upstream and downstream.

When a fluid does flow through the tube, the temperature curve, measured at the tube wall, is as shown by the curve 5: "sagged" (concave) upstream and convex downstream. The extent to which the temperature curve deviates from the substantially linear situation is a measure of the flow. When, e.g., the temperatures are measured at 6 and 7-locations on the tube wall which are situated at such a distance from the heat source that in situ the deviation of the temperature from that in the linear situation is significant-the occuring temperature difference ΔT is the measure referred to.

FIG. 2 shows how, with the help of the same principle as that according to FIG. 1, a flow may be measured, though with a much smaller space occupation. The tube 8, through which flows the fluid flow 9, is comparable to the tube 2 according to FIG. 1, though this time bent in a "U". The heat-conducting body 10 causes the temperatures of the tube ends which correspond to the ends of the legs of the "U" to be equal. 11 is a thermopile present between the two legs of the "U" with which, along the entire length of the tube walls, the temperature differences are measured and may be supplied in integrated form. The upstream and downstream temperature curves are denoted by 12 and 13, respectively; in the event of an integrated measurement with the help of a thermopile 11, the surface 14 between the curves 12 and 13 is the desired measure of the fluid flow.

The device according to FIG. 3-a device according to the invention-makes possible the method according to the invention. Here, too, there again is a fluid flow 15 flowing through a tube 16 having a conducting wall 17. At 18, the tube 16, and therewith the fluid, is heated. With the help of the thermopile 19, there is measured the temperature difference between the tube wall 17 and a fixed reference leg 20. Said leg 20 extends between the heated part 18 of the tube 16 and the location 21, where tube 16 and leg 20 are in heat-conducting contact with one another. In the same manner as indicated in FIG. 2, the size of the surface 22-the temperature difference between the tube wall 17 and the reference leg 20-is integrated along the entire length over which there occurs a temperature difference between the two.

Comparison of said surface 22 to the surface 14 as indicated in FIG. 2 shows that the measuring sensitivity amounts to half when measurements are made only on the flow on one side of the heat source.

The surface 22, and therefore the signal to be measured, increases in tandem with an increasing fluid flow. In addition, said signal depends on the temperature difference between the temperature at the location where the heat source is situated and the temperature at the location where tube wall and reference leg again have an equal temperature: the measuring range.

We claim:

1. Apparatus for measuring mass flow rates of liquids or gases flowing through a tube, the apparatus operable with a source of heat, the apparatus comprising:

a- a tube which is heat conductive and generally straight and through which said liquids or gases to be measured flows, b- a second element which is heat conductive and extends generally parallel to and is spaced apart from said tube, c- a set of first and second axially spaced locations, respectively upstream and downstream on said tube and said second element, d- first means for thermally connecting said tube and said second element at said first location, e- second means for thermally connecting said tube and said second element at said second location and for thermally conducting heat from the heat source to said tube and said second element only at said second location, and f- third means for measuring the temperature difference between said tube and said second element along their lengths between said first and second locations while a mass of liquid or gas is flowing through said tube, thereby to determine the fluid flow as a function of said measured temperature difference.

2. Apparatus according to claim 1 wherein said means for measuring the temperature difference is a thermopile.

3. Apparatus according to claim 1 wherein said first means comprises electrical heater wire engaging said tube and said second element.

4. Apparatus for measuring mass flow rates of liquids or gases flowing through a tube, the apparatus operable with a source of heat, the apparatus comprising:

a- a tube which is heat conductive and through which said liquids or gases to be measured flows, b- a second element which is heat conductive and is spaced apart from said tube, c- a set of first and second axially spaced locations, respectively upstream and downstream on said tube and said second element, d- first means for thermally connecting said tube and said second element at said first location, e- second means for thermally connecting said tube and said second element at said second location and for thermally conducting heat from the heat source to said tube and said second element only at said second location, and f- third means for measuring the temperature difference between said tube and said second element along their lengths between said first and second locations while a mass of liquid or gas is flowing through said tube, thereby to determine the fluid flow as a function of said measured temperature difference.

5. A method for measuring a flow of liquid or gas fluid flowing through a tube, the method being operable with a source of heat, the method including the steps:

a- flowing said fluid through a heat-conducting tube, b- providing a second heat-conductive element generally parallel to and spaced apart from said tube, c- establishing first and second axially spaced locations, respectively upstream and downstream on said tube and said second element, d- thermally connecting said tube and said second element at said first and second locations, e- conducting heat from said heat source to said tube and to said second element only at said second location while flowing said fluid through said heat-conducting tube, and f- measuring a temperature difference between said tube and said second element along their lengths between said first and second locations while flowing said fluid through said heat-conducting tube, to thereby determine the fluid flow as a function of said measured temperature difference.

6. A method according to claim 5 wherein a lengthwise space is provided between said tube and said second element and further wherein the step of measuring the temperature difference comprising providing a thermopile lengthwise in said space between said tube and said second element.

* * * * *